United States Patent
Clausse

(10) Patent No.: US 8,062,017 B2
(45) Date of Patent: Nov. 22, 2011

(54) SPLICE BAR FOR TIRE TREAD EXTRUSION APPARATUS

(75) Inventor: Damien Ghislain Clausse, Fauvillers (BE)

(73) Assignee: The Goodyear Tire & Rubber Co, Akron, OH (US)

( * ) Notice: Subject to any disclaimer, the term of this patent is extended or adjusted under 35 U.S.C. 154(b) by 512 days.

(21) Appl. No.: 12/250,001

(22) Filed: Oct. 13, 2008

(65) Prior Publication Data

US 2010/0092589 A1 Apr. 15, 2010

(51) Int. Cl.
*B29C 47/06* (2006.01)
*B29C 47/14* (2006.01)

(52) U.S. Cl. .................. 425/133.5; 425/192 R; 425/462

(58) Field of Classification Search ............... 425/133.5, 425/192 R, 462
See application file for complete search history.

(56) References Cited

U.S. PATENT DOCUMENTS

| | | | | |
|---|---|---|---|---|
| 6,294,119 | B1 * | 9/2001 | Nakamura | 264/173.12 |
| 6,495,081 | B2 * | 12/2002 | Benatti | 264/173.17 |
| 6,746,227 | B2 * | 6/2004 | Helle et al. | 425/133.5 |
| 6,834,693 | B1 * | 12/2004 | Calvar et al. | 152/152.1 |
| 6,951,233 | B1 * | 10/2005 | Calvar et al. | 152/152.1 |
| 6,994,817 | B2 * | 2/2006 | Calvar et al. | 264/173.1 |
| 2002/0157747 | A1 * | 10/2002 | Shimada et al. | 152/209.5 |

* cited by examiner

*Primary Examiner* — Yogendra Gupta
*Assistant Examiner* — Joseph Leyson
(74) *Attorney, Agent, or Firm* — David L King

(57) ABSTRACT

A splice bar for a tire tread die designed for providing a narrow strip of electrically conductive rubber extending from a lower under tread to the surface of the outer tread by positioning a slotted chimney block in a the outer tread rubber passage and having a passage between the chimney slot and the under tread rubber passage specially shaped for improving the flow of rubber during extrusion. This passage is essentially straight for guiding a strip-shaped stream of rubber of the under tread to the chimney slot. The passage intersects the rear surface of the splice bar to form a generally rectangular shaped corridor extending from the rear surface to the chimney slot.

14 Claims, 7 Drawing Sheets

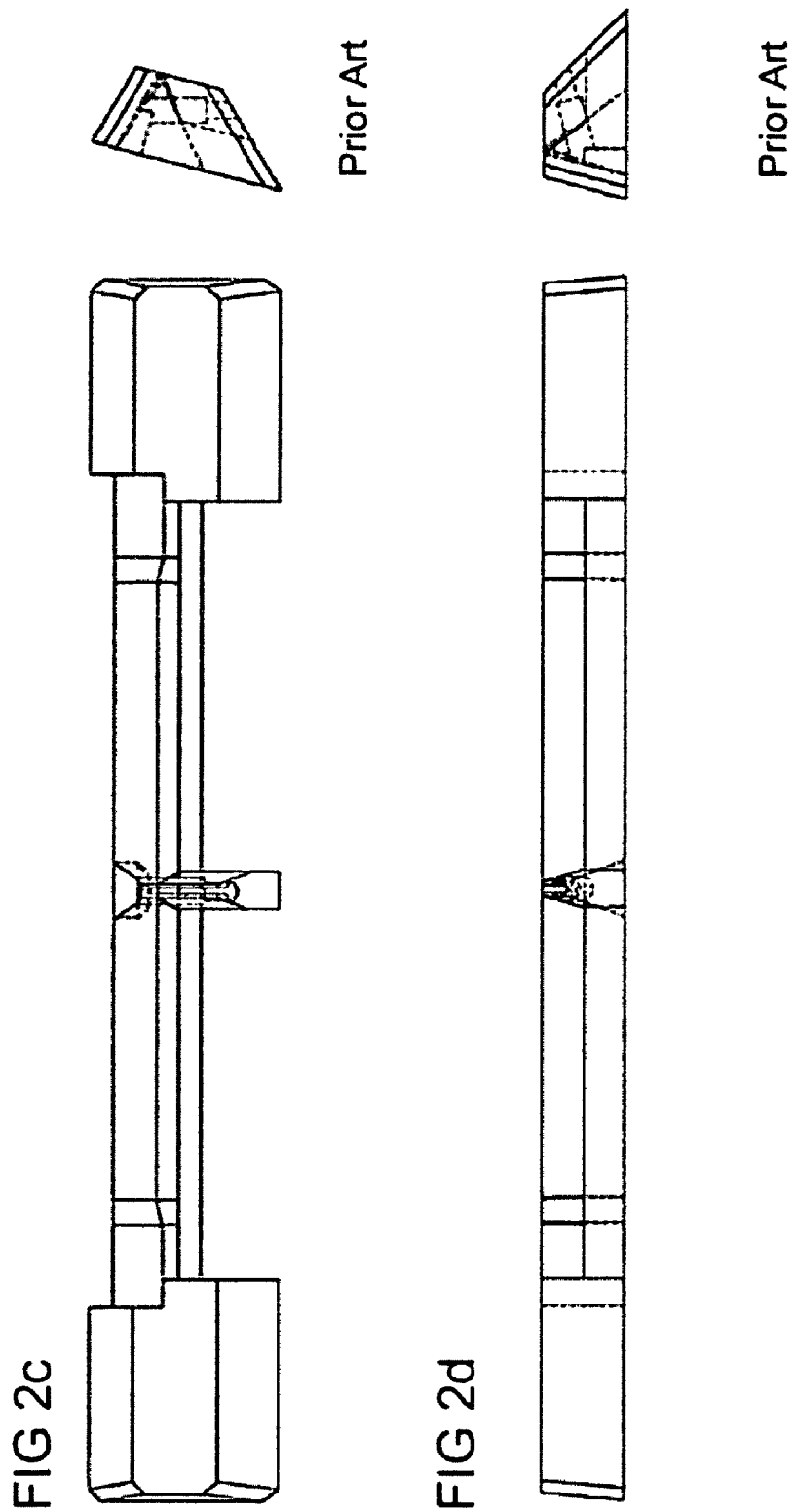

SPLICE BAR FOR TIRE TREAD EXTRUSION APPARATUS

FIELD OF THE INVENTION

The present invention is directed to a splice bar for an extrusion apparatus. More specifically, the present invention is directed to a splice bar for a tire tread extrusion apparatus designed for extruding tire tread with a strip of material for discharging the electro static charges produced by a vehicle having tires with non-conducting rubber treads.

BACKGROUND OF THE INVENTION

Non-conducting low hysteresis rubber treads are used in tires for achieving a lower rolling resistance but have the disadvantages of not discharging the electro static charges generated and accumulated during drive. A common solution to this problem consists in providing a narrow strip of conductive rubber at a widthwise center region of the tire tread. To that end, it is known from U.S. Pat. No. 6,746,227 B2 to form a narrow strip of conductive rubber by conveying the conductive rubber of a lower under tread flow channel in a tire tread die through a passage into a chimney block positioned in the flow channel for the non-conductive tread rubber and through a slot in the chimney block. It results that a narrow strip is formed with its face at the tread surface and in position for discharging static electricity generated by the rolling vehicle. The chimney block is formed on a splice bar positioned in the die in order to splice the two treads of different rubbers.

Details of such a splice bar are illustrated in FIG. 1. It shows indeed a splice bar 1' with an upper surface 4' for conveying the non conductive rubber of the upper tread and a lower surface 5' for conveying the conductive rubber of the under tread. Positioning and conveying blocks 6' and 7' are arranged at both ends of the splice bar in contact with the upper and lower surfaces. The upper and lower treads are united when leaving the surfaces of the bar. A chimney block 2' is arranged at the upper surface 4', where this chimney block is arranged with a slot 3' communicating with the lower surface 5' via a chimney 8' and a chimney arrival channel 9'.

This arrangement is satisfying for the extrusion of passenger tire treads but not for thicker tire treads like, for example, truck tires. Indeed, the flow of rubber in the slot for forming the narrow strip is too low or irregular in the upper section of the slot. This results in a not fully formed strip, a bad contact with the upper tread and more generally in an unsatisfactory upper tread.

Additionally, the machining of the splice bar is rather complex due to the complexity of the passage as is illustrated in FIGS. 2a, 2b, 2c and 2d. Indeed, a bar after being cast, forged or machined to a trapezoid cross section is machined in five operations requiring four different fastenings. FIG. 2a illustrates the first fastening where the splice bar is positioned so that the lower surface 5' (as illustrated in FIG. 1) substantially faces upwards. This position is for machining the surfaces of the base side of the splice bar and also for machining the chimney arrival channel in the base side. FIG. 2b illustrates the second fastening for machining. This position corresponds essentially to the position of FIG. 1 the cap side. FIG. 2c illustrates the third fastening for drilling the chimney. The splice bar is positioned with the lower surface 5' (as illustrated in FIG. 1) approximately face upwards like in FIG. 2a whereas the bar is inclined about its longitudinal axis for bringing the location of the chimney to the vertical. FIG. 2d illustrates the fourth fastening for machining the slot through which the narrow strip of conductive rubber will be extruded. The downstream side of the chimney block faces upwards in this position.

DEFINITIONS

The concepts "upper", "lower", "base", "cap", "top", "bottom", "horizontal" and "vertical", "rear" and "front" which are used in the following description are used in relation with the orientation of the assembly in FIG. 3 merely for the sake of clarity and are not to be understood in any case as absolute and limiting. The assembly described can be oriented differently while keeping the same relative arrangements and design.

SUMMARY OF THE INVENTION

There is provided a splice bar for guiding and uniting a first stream of rubber with a second stream of rubber in a tire component extruding apparatus, comprising: a first surface for guiding the first stream of rubber; a second surface for guiding the second stream of rubber, the first and second surfaces converging downstream for uniting the first and second streams of rubber; a third surface intersecting the first and second surfaces upstream; a chimney block extending from the first surface; a slot provided at a downstream side of the block and extending along the block; a passage arranged between the slot and the second surface for communicating the slot with the second surface in order to feed a strip of rubber from the second stream to the first stream through the slot during the extrusion process; wherein the passage is shaped such that it forms a substantially straight passage between the third surface and the slot.

In one aspect of the invention, the passage forms an opening in the third surface and the passage comprises a straight line between a portion of the slot distant from the first surface and a portion of the opening distant from the second surface.

In another aspect of the invention, the longitudinal section of the passage has a trapezoid shape extending from the slot to the opening in the third surface.

In yet another aspect of the invention, the opening in the third surface is rectangular and its height is higher than half of the height of the third surface.

In yet another aspect of the invention, the height of the rectangular opening essentially corresponds to the height of the slot so that the longitudinal section of the passage has a parallelogram shape extending from the slot to the opening in the third surface.

In yet another aspect of the invention, the cross-section of the passage is trapezoid, preferably rectangular, when going from the third surface to the slot.

In yet another aspect of the invention, the passage communicates the slot with the second surface continuously from the intersection with the third surface until the slot.

In yet another aspect of the invention, the passage is shaped such as to guide a strip-shaped stream of rubber substantially parallel to the lower surface until the slot.

Finally there is also provided a splice bar for guiding and uniting a first stream of rubber with a second stream of rubber in a tire tread extruding apparatus, comprising: a first surface for guiding the first stream of rubber; a second surface for guiding the second stream of rubber, the first and second surfaces converging downstream for uniting the first and second streams of rubber; a third surface intersecting the first and second surfaces upstream; a chimney block extending from the first surface; a slot provided at a downstream side of the block and extending along the block; a passage arranged between the slot and the second surface for communicating the slot with the second surface in order to feed a strip of rubber from the second stream to the first stream through the slot during the extrusion process; wherein the passage is shaped such that it communicates the slot with the second surface continuously from the intersection with the third surface until the slot.

In one aspect of the invention, the passage is free of obstacle.

In another aspect of the invention, the passage is shaped such as to guide a strip-shaped stream of rubber substantially parallel to the lower surface until the slot.

In yet another aspect of the invention, the passage tapers from the third surface to the slot.

In yet another aspect of the invention, the longitudinal section of the passage has a trapezoid shape extending from the slot to an intersection of the passage with third surface.

In yet another aspect of the invention, the passage forms a rectangular opening in the third surface having a height substantially the same as the height of the slot.

BRIEF DESCRIPTION OF THE DRAWINGS

The invention will be described by way of example and with reference to the accompanying drawings in which:

FIG. 2c is a plan view and a side view of the splice bar of FIG. 1 in the fastening position 3 for the drilling of the chimney.

FIG. 2d is a plan view and a side view of the splice bar of FIG. 1 in the fastening position 4 for the machining of the slot.

DETAILED DESCRIPTION OF THE INVENTION

Figure 1:
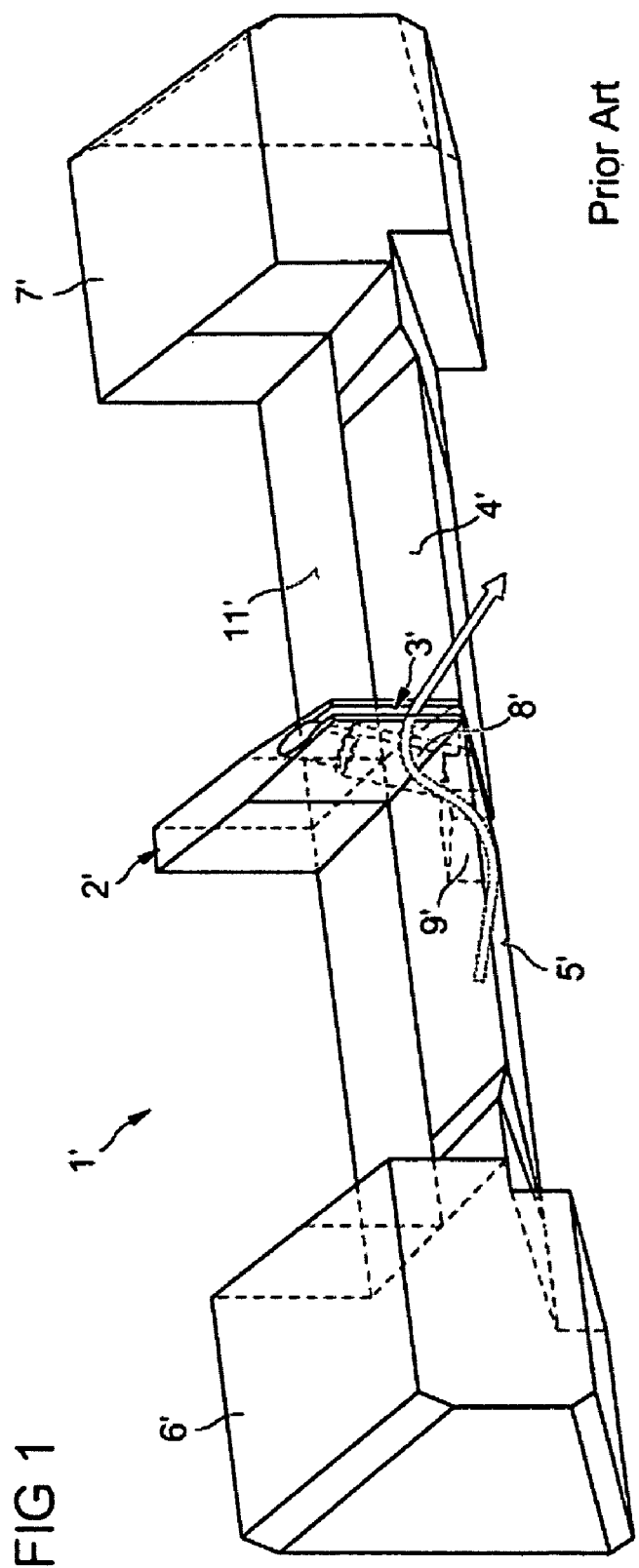
FIG. 1 is a perspective view of a splice bar according to the prior art.
Figures 2A, 2B:
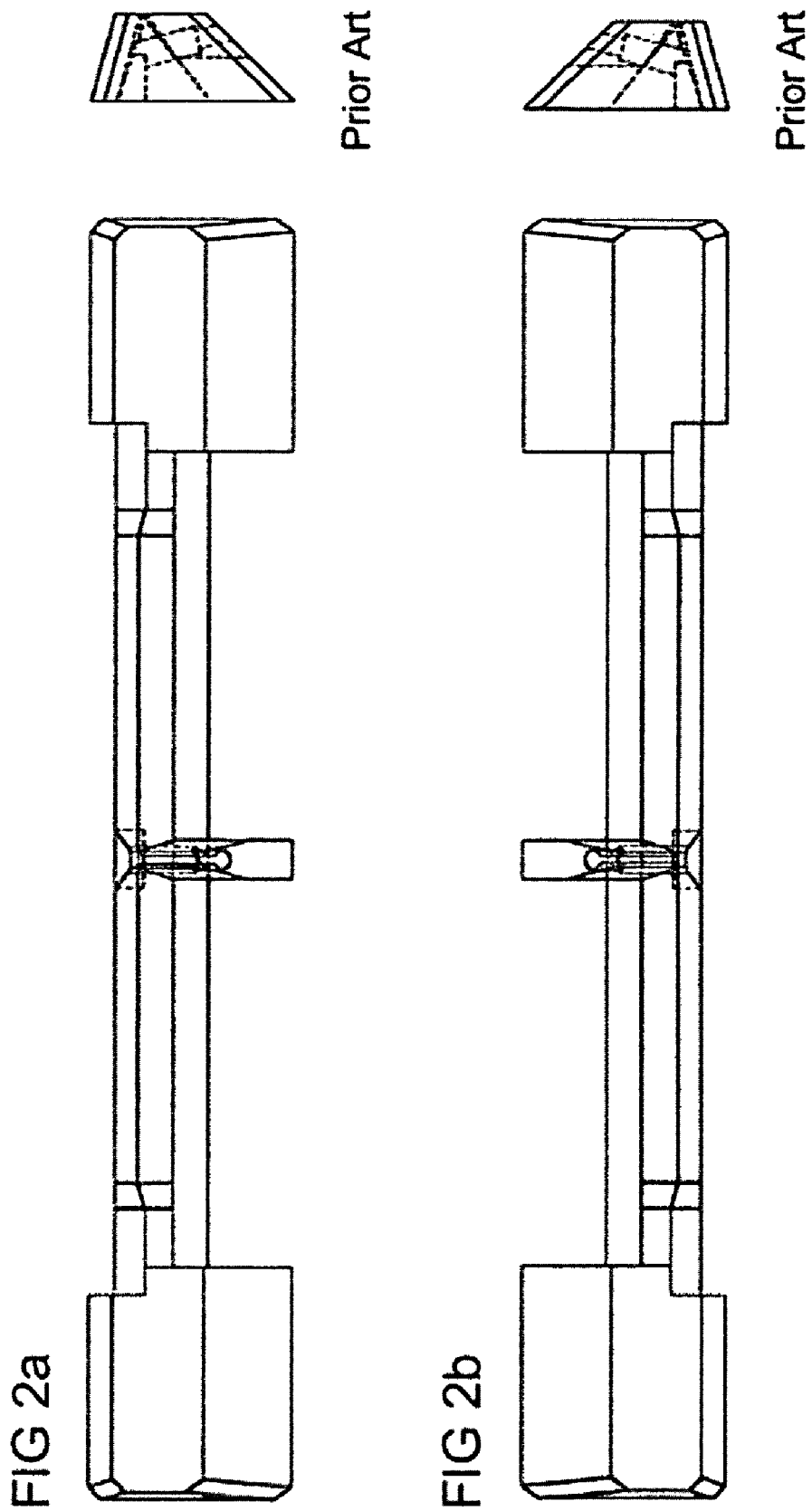
FIG. 2a is a plan view and a side view of the splice bar of FIG. 1 in the fastening position 1 for the machining of the lower surface and the chimney arrival channel.
FIG. 2b is a plan view and a side view of the splice bar of FIG. 1 in the fastening position 2 for the machining of the upper surface.

The following language is of the best presently contemplated mode or modes of carrying out the invention. This description is made for the purpose of illustrating the general principles of the invention and should not be taken in a limiting sense. The scope of the invention is best determined by reference to the appended claims. The reference numerals as depicted in the drawings are the same as those referred to in the specification.

Figure 3:
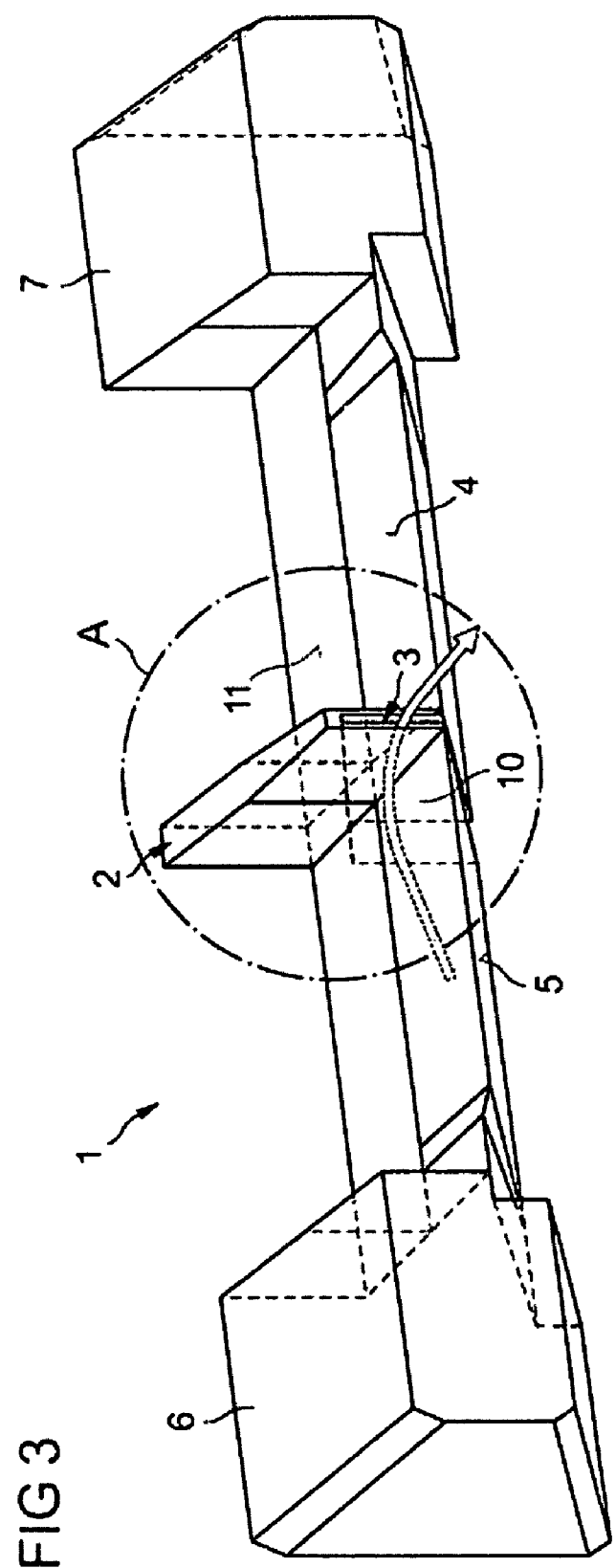
FIG. 3 is a perspective view of a splice bar according to the invention.

FIG. 3 is a perspective view of a splice bar for a tire tread extrusion die in accordance with the invention. It comprises an upper surface 4 for conveying the non conductive rubber and extruding the upper tread, and a lower surface 5 for conveying the conductive rubber and extruding the under tread. These two surfaces intersect downstream and form an angle in order to splice the two treads or streams. The non conductive rubber for the upper tread arrives from an upper side of the splice bar and the conductive rubber arrives from a lower side of the splice bar. The main purpose of the splice bar is therefore to guide and convey the two kinds of rubber by bringing them in contact before exiting the extrusion die. A final die is typically positioned at the exit of the splice bar in order to shape both the lower and upper treads. Blocks 6 and 7 permit a precise and safe positioning of the splice bar 1 and also serve as lateral conveying surface for the rubber. The blocks and the upper surface form therefore a first passage and the blocks and the lower surface form a second passage.

The rubber for the under or base tread is typically a conductive low hysteresis compound and the upper or cap tread is typically a non conductive very low hysteresis compound in which the carbon black is partially replaced by silica. The friction of the carbon black particles is the first cause of the tire heating, and consequently the increase in hysteresis. The substitution of the carbon black by silica allows a lower heat generation of the tread and therefore a lower rolling resistance. Such a compound is however non conductive due to the removal of the carbon black and does not allow the transfer of electrons between the vehicle and the road. The presence of a strip of conductive compound in the center of the cap makes it possible to discharge the accumulated static electricity.

Figure 3A:
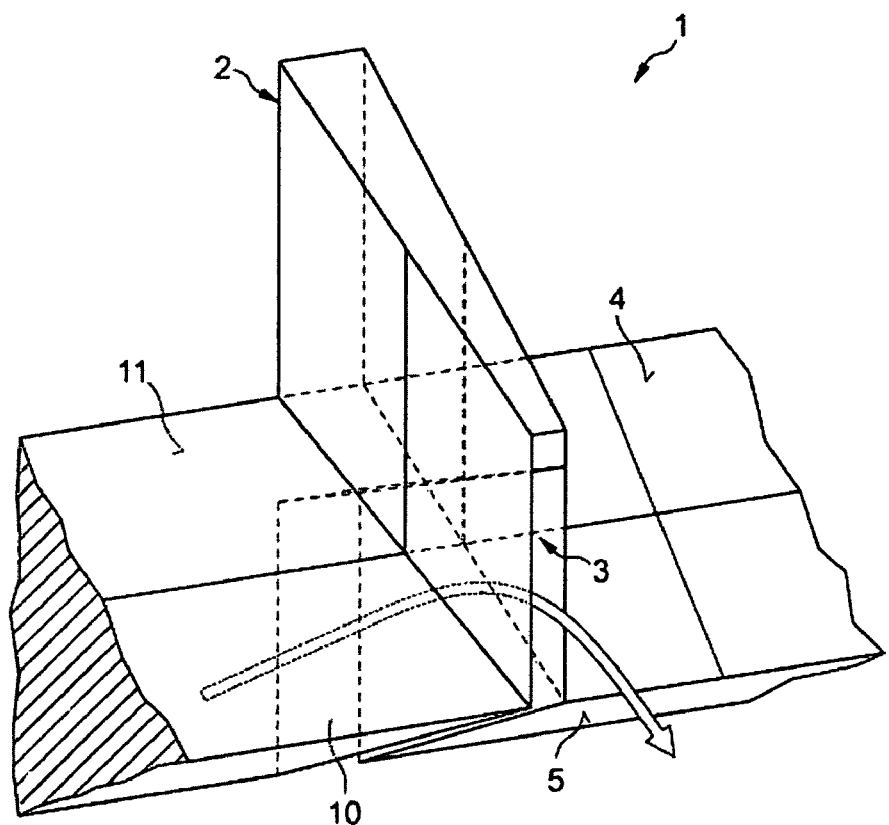
FIG. 3a is a perspective magnified view of the area A in FIG. 3.

To that end an elongate chimney block 2 is arranged on the cap surface 4, approximately at the center with regard to the longitudinal axis. This block tapers downstream in order to facilitate the flow of rubber. This block extends on the whole upper surface along the flow direction of the rubber, i.e. from a rear surface 8 of the bar until the intersection of the upper and lower surfaces 4 and 5. A slot 3 is arranged on the front surface of the block 2 for extruding the narrow strip of rubber. To that end, a passage 10 is made in the splice bar for connecting the slot 3 with the lower passage of conductive rubber. This passage 10 is shaped as a slot perpendicular to the lower or base surface 5 and the bottom face of this slot extends essentially parallel to the lower surface. The passage widens from the front of the block 2 to the rear surface 8 of the bar and serves as a chimney for bringing conductive rubber from the lower passage to the slot 3 during extrusion. The upper bottom of the slot forming the passage 10 is essentially straight and the passage is generally straight until the slot 3 for the base stream of rubber entering the passage upstream, at the vicinity of the third surface. The fact that this essentially straight passage provides a less tortuous or, said differently, a straighter trajectory for the flow of rubber is illustrated by the arrow in FIG. 3 showing the flow of rubber in the passage until the slot 3. The sectional shape of the passage 10 in a vertical plane parallel to the flow of gum is trapezoid, more precisely a parallelogram. The passage 10 is generally shaped as a slot made in the lower surface 5 extending from the third surface 11 to the front or downstream face of the chimney block 2 thereby being continuous with the slot 3 in the chimney block 2. The passage 10 does not therefore comprise any obstacle for the stream of rubber. The width of the cross-section of the passage 10 increases from the slot 3 to the third surface 11. In other words, the passage 10 tapers in the direction of the slot 3. The cross-section of the passage 10 is rectangular ranging from the rectangular cross-section of the slot 3 to the rectangular intersection with the third surface 11. Area A of FIG. 3 is shown in a magnified perspective in FIG. 3a, showing more detailed the passage 10, chimney block 2, and slot 3.

The passage 10 intersects with the third surface 11 and creates an opening there in. This opening is rectangular due to rectangular cross-section of the passage. This rectangular opening extends vertically over a major part of the third surface, i.e. more than ⅔ of the third surface height counted from its intersection with the lower surface 5 to its intersection with the upper surface 4. In the present case, the height of the opening corresponds approximately to the height of the slot 3. This allows an early entrance in the passage of the base stream of rubber. This portion of the rubber stream which entered upstream the passage encounters a reduced pressure drop in the passage due to its straight shape, i.e. the absence of a reduced cross-section or of curves which would otherwise increase the flow resistance and brake the rubber stream, in particular at the upper portion of the passage which corresponds to the most critical portion of the conductive strip. The portion of the rubber stream in the passage 10 is pushed by the main base stream of rubber through the opening in the third surface and is driven by the same main base stream along the opening of the passage in the lower surface 5. The flow characteristics of this passage 10 are thereby optimized.

Figure 4A:
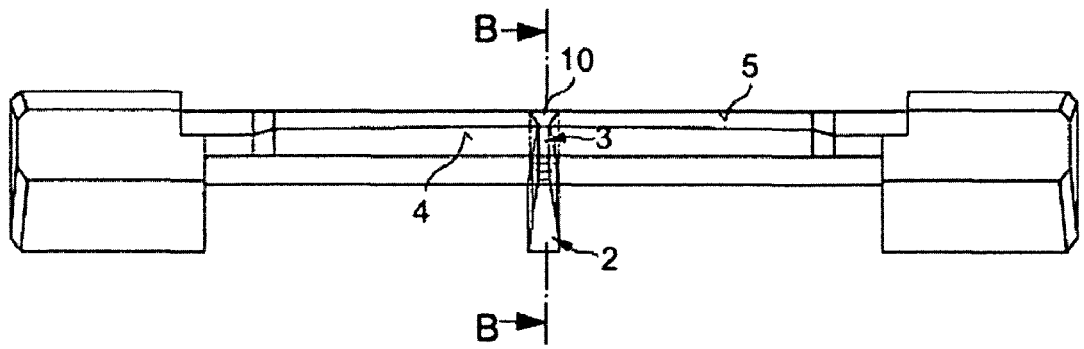
FIG. 4a is a plan view of the splice bar according to the invention in the fastening position 1 for the machining of the lower surface and the chimney groove.
Figure 5A:
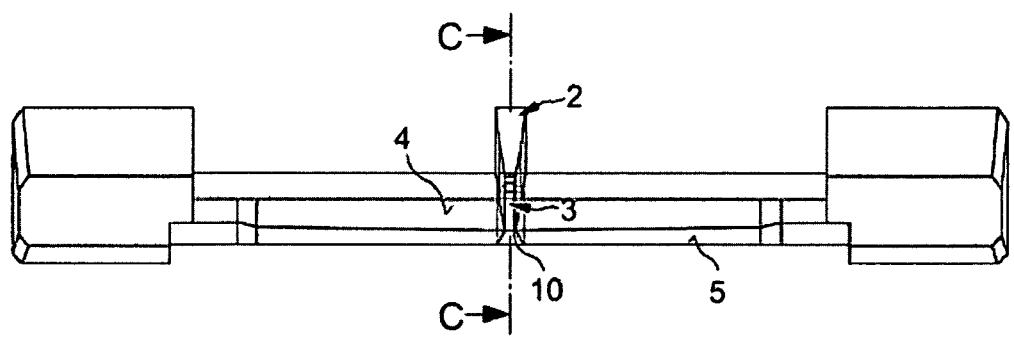
FIG. 5a is a plan view of the splice bar according to the invention in the fastening position 2 for the machining of the upper surface.

A raw bar with a trapezoid cross section is typically first formed by machining an elongate bar of construction steel and then machined to the final shape of the splice bar. FIGS. 4a and 5a illustrate the different fastening positions for the machining of the different surfaces and the chimney on the raw bar. FIG. 4a illustrates the first fastening position of the splice bar for machining the base side and also the slot 3 and passage 10. The lower or base surface 5 faces upward. Due to its geometry and shape the chimney can therefore be machined with the same position of the bar as for the surfaces of the base side. The second fastening position of the bar corresponding to the position of FIG. 3 is shown in FIG. 5a for machining the cap side. Consequently, only two fastening positions are required for machining the whole bar.

Figure 4B:
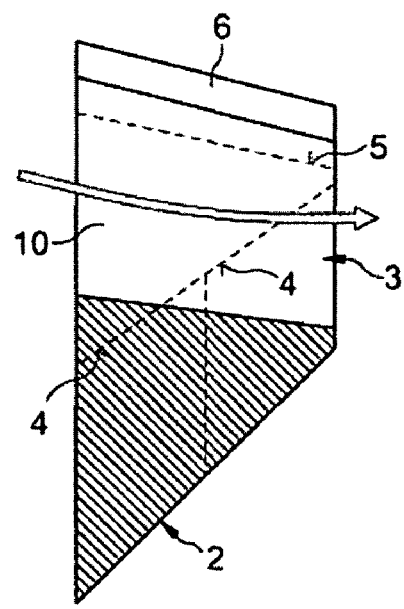
FIG. 4b is a cross-sectional view along the line B shown in FIG. 4a, showing the cross section of the splice bar in accordance with the invention.
Figure 5B:
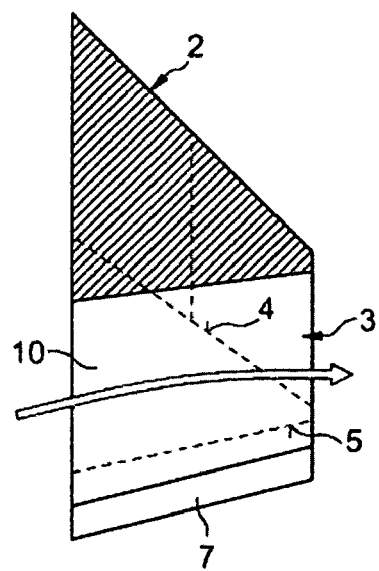
FIG. 5b is a cross-sectional view along the line C shown in FIG. 5a, showing the cross section of the splice bar in accordance with the invention.

FIGS. 4b and 5b show cross sections of the splice bar viewed from different perspectives. FIG. 5a is the cross section which is indicated by the line B in FIG. 4a. It shows chimney block 2, the upper surface 4, passage 10, slot 3, lower surface 5 and block 7. A flow of rubber through the passage 10 is indicated by the arrow. FIG. 5b is the cross section which is indicated by the line C in FIG. 5a. It shows chimney block 2, the upper surface 4, passage 10, slot 3, lower surface 5 and block 6. A flow of rubber through the passage 10 is indicated by the arrow. The chimney or passage 10 can however be shaped differently.

In an alternative mode, the slot formed by the passage 10 can also taper from the lower surface to the upper bottom.

In a further alternative mode, the passage can be shaped even closer to the horizontal than in the preferred mode so that the opening defined by the passage in the rear surface 8 comes closer to or contacts the chimney block 2 or the upper surface 4.

The upper bottom of the passage must not necessarily be totally straight. In a further alternative mode, the passage can be shaped such that its upper bottom extending from the slot 3 to the rear surface is slightly curved. This curved portion can be concave or convex.

The chimney block must not necessarily be positioned at the center. Indeed, the narrow strip of conductive rubber can be off-set from the tread center or even at the tread side but must be positioned in a part of the tread in contact with the road.

The invention has been described with reference to a best more. Obviously, modifications and alternations will occur to others upon a reading and understanding of this specification. It is intended to include all such modifications and alternations in so far as they come within the scope of the appended claims or the equivalents thereof.

What is claimed is:

1. A splice bar for guiding and uniting a first stream of rubber with a second stream of rubber in a tire component extruding apparatus, comprising:
    a first surface for guiding the first stream of rubber;
    a second surface for guiding the second stream of rubber, the first and second surfaces converging downstream for uniting the first and second streams of rubber;
    a third surface intersecting the first and second surfaces upstream;
    a chimney block extending from the first surface;
    a slot provided at a downstream side of the block and extending along the block;
    a passage arranged between the slot and the second surface for communicating the slot with the second surface in order to feed a strip of rubber from the second stream to the first stream through the slot during the extrusion process; wherein
    the passage is shaped such that it forms a substantially straight passage between the third surface and the slot.

2. A splice bar according to claim 1, wherein the passage forms an opening in the third surface and the passage comprises a straight line between a portion of the slot distant from the first surface and a portion of the opening distant from the second surface.

3. A splice bar according to claim 2, wherein the longitudinal section of the passage has a trapezoid shape extending from the slot to the opening in the third surface.

4. A splice bar according to claim 2, wherein the opening in the third surface is rectangular and its height is higher than half of the height of the third surface.

5. A splice bar according to claim 4, wherein the height of the rectangular opening essentially corresponds to the height of the slot so that the longitudinal section of the passage has a parallelogram shape extending from the slot to the opening in the third surface.

6. A splice bar according to claim 1, where the cross-section of the passage is trapezoidal or rectangular, when going from the third surface to the slot.

7. A splice bar according to claim 1, wherein the passage communicates the slot with the second surface continuously from the intersection with the third surface until the slot.

8. A splice bar according to claim 1, wherein the passage is shaped such as to guide a strip-shaped stream of rubber substantially parallel to the lower surface until the slot.

9. A splice bar for guiding and uniting a first stream of rubber with a second stream of rubber in a tire tread extruding apparatus, comprising:
    a first surface for guiding the first stream of rubber;
    a second surface for guiding the second stream of rubber, the first and second surfaces converging downstream for uniting the first and second streams of rubber;
    a third surface intersecting the first and second surfaces upstream;
    a chimney block extending from the first surface;
    a slot provided at a downstream side of the block and extending along the block;
    a passage arranged between the slot and the second surface for communicating the slot with the second surface in order to feed a strip of rubber from the second stream to the first stream through the slot during the extrusion process; wherein the passage is shaped such that it communicates the slot with the second surface continuously from the intersection with the third surface until the slot.

10. A splice bar according to claim 9, wherein the passage is free of obstacle.

11. A splice bar according to claim 9, wherein the passage is shaped such as to guide a strip-shaped stream of rubber substantially parallel to the lower surface until the slot.

12. A splice bar according to claim 9, wherein the passage tapers from the third surface to the slot.

13. A splice bar according to claim 9, wherein the longitudinal section of the passage has a trapezoid shape extending from the slot to an intersection of the passage with the third surface.

14. A splice bar according to claim 13, wherein the passage forms a rectangular opening in the third surface having a height substantially the same as the height of the slot.

* * * * *